S. E. LEE.
SELF CLEANING SCREEN.
APPLICATION FILED JUNE 27, 1918.

1,331,935.

Patented Feb. 24, 1920.

INVENTOR
Shelley E. Lee
BY Thong Townsend
his ATTORNEYS

UNITED STATES PATENT OFFICE.

SHELLEY E. LEE, OF OROVILLE, CALIFORNIA.

SELF-CLEANING SCREEN.

1,331,935.  Specification of Letters Patent.  Patented Feb. 24, 1920.

Application filed June 27, 1918. Serial No. 242,139.

*To all whom it may concern:*

Be it known that I, SHELLEY E. LEE, a citizen of the United States, residing at Oroville, in the county of Butte and State of California, have invented new and useful Improvements in Self-Cleaning Screens, of which the following is a specification.

This invention relates to a self cleaning screen which is particularly adapted for use in irrigation ditches to remove weeds and the seeds thereof, before the water is permitted to flow out on the land to be irrigated.

In California and other western States where irrigation is extensively employed, it has been found that weeds of all varieties grow in great profusion and abundance along the ditches and land through which the water travels and that these weeds and particularly the seeds thereof, are carried for miles by the water and deposited upon the land irrigated. These weeds take root quickly and as most weeds are hardy and willing growers, it can readily be seen that the crops are not only injured but often almost entirly destroyed or overgrown. This is particularly true when considering certain districts in California where rice is being grown. These rice fields are sometimes flooded or irrigated daily and the amount of weeds and seeds deposited upon the land is so great that the weeds soon outgrow the rice and therefore destroy the same.

The object of the present invention is to provide a simple form of screening device which is adapted to be placed in the irrigation ditch at a point where it will screen out and remove the weeds and seeds before the water is permitted to flow out on the land to be irrigated. Another object of the invention is to provide a means for automatically cleaning the screens so that the water may pass freely therethrough without danger of clogging or choking the same. Further objects will hereinafter appear.

The invention consists of the parts and the construction and combination of parts as hereinafter more fully described and claimed having reference to the accompanying drawings, in which—

Figure 1:
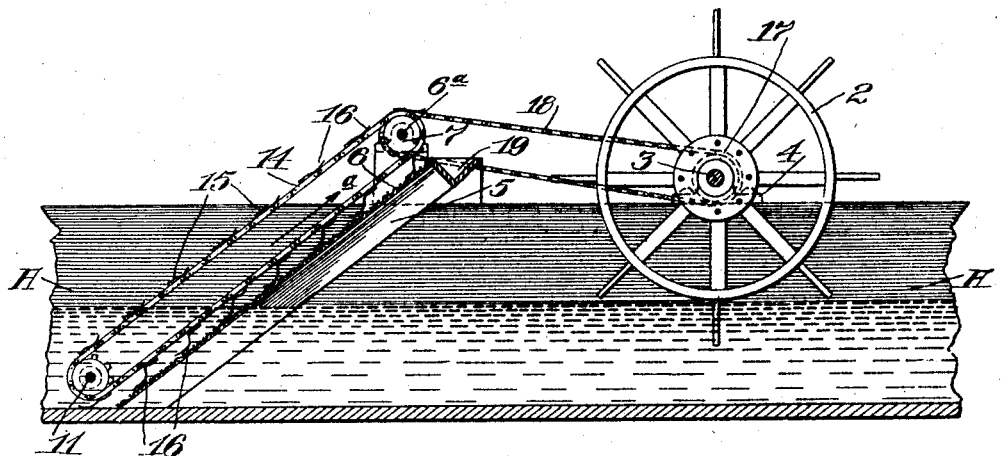
Figure 1 is a side elevation of the device partially in section.
Figure 2:
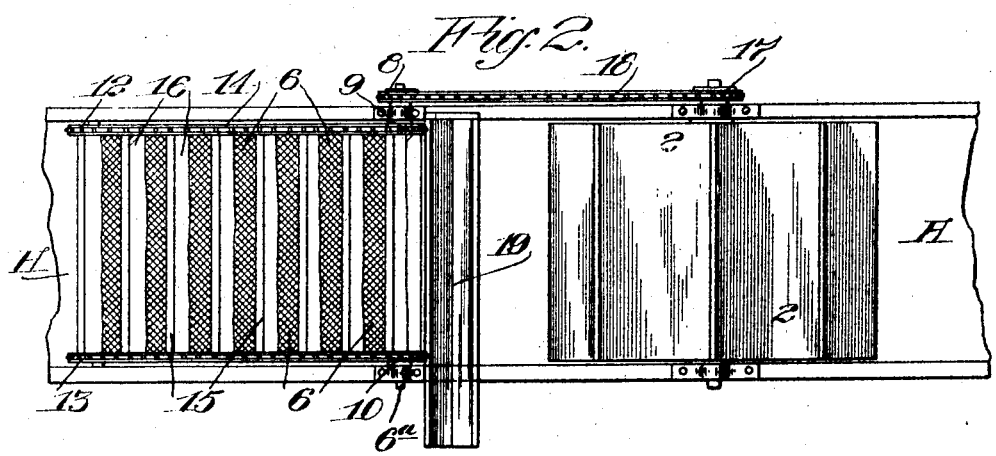
Fig. 2 is a plan view of the same.

Referring to the drawings in detail A indicates an irrigation ditch or flume in which is mounted a water wheel 2, this water wheel may be constructed in any suitable manner and is in this instance supported upon a shaft 3, which extends crosswise of the flume, said shaft being supported in bearing 4. Also extending crosswise of the flume is an angularly disposed frame 5 upon which is secured a fine mesh wire screen 6. All the water flowing through the ditch must pass through the screen and any weeds, seeds or other flotsam carried by the water will therefore adhere to the forward face of the same. For the purpose of removing the material thus caught and also for the purpose of preventing clogging of the screen, the following cleaning mechanism is employed. Journaled in bearings 7, secured on the upper end of the frame 5 is a shaft $6^a$ upon which is secured three sprocket wheels 8, 9 and 10, also journaled at the lower end of the frame is a shaft 11 upon which are carried two sprocket wheels 12 and 13; the sprockets 12 and 13 being in alinement with the sprocket wheels 9 and 10. Passing over each set of alined sprockets is an endless linked chain 14 and connecting said chains are a plurality of cross bars 15 which function as carriers for a plurality of canvas flaps or scrapers 16, each cross bar 15 carries a canvas strip or flap which extends clear across the face of the screen and as power is transmitted from the water wheel through a sprocket 17 and a chain 18 to revolve the shaft $6^a$, it can readily be seen that the chains 14 will travel in the direction of arrows $a$, thus dragging the canvas flaps upwardly over the outer surface of the screen, and removing any flotsam that may adhere thereto. The material removed is deposited in an incline trough 19 which extends crosswise of the flume; the incline of the trough permitting the material to flow off to one side of the ditch where it may be removed from time to time in any suitable manner. Sufficient water adheres and is carried into the trough by the canvas flaps to maintain a flow which will remove the seeds and other flotsam.

A screen constructed and employed in the manner herein described has proven to be of great value, particularly to rice growers, as it positively removes all the weed seeds which heretofore have caused so much trouble. The screen keeps clean at all times due to the continuous movement of chains 14 driven by the water wheel and it therefore permits a free and unrestricted flow of the water through the ditch.

Having thus described my invention, what I claim and desire to secure by Letters Patent is—

1. The combination with an irrigating flume of an inclined screen extending crosswise of the flume, a pair of sprocket chains adapted to travel over the forward face of the screen, a plurality of cross bars connecting said chains, a canvas flap carried by each crossbar adapted to contact with the face of the screen to remove and elevate flotsam adhering to the face of the screen and means actuated by the flow of water through the screen for continuously moving the chains.

2. The combination with an irrigating flume of inclined chains extending crosswise of the flume, a pair of sprocket wheels adapted to travel over the forward face of the screen, a plurality of crossbars connecting said chains, a canvas drag carried by each crossbar adapted to contact with the surface of the screen to clean the same and to elevate any flotsam adhering thereto, an inclined trough extending crosswise of the flume adapted to receive the material or flotsam removed, a water wheel positioned in the flume adapted to be driven by the water flowing through the screen and the flume and means for transmitting power from said water wheel to drive the chains which carry the crossbars and the canvas drags.

3. The combination with an irrigating flume of an inclined screen extending crosswise of the flume, a pair of sprocket chains adapted to travel over the forward face of the screen, means actuated by the flow of water through the screen for continuously moving the chains, a plurality of cross bars connecting said chains, a trough secured cross-wise at the upper end of the screen and inclined to one side, a canvas flap carried by each cross bar contacting with the face of the screen and adapted to collect the flotsam adhering to the face of the screen and to deposit the same in the trough secured at the upper end of the screen, said flaps being also adapted to deposit sufficient water in the trough with the flotsam, that the flotsam is readily carried away and ejected to one side of the flume.

In testimony whereof I have hereunto set my hand in the presence of two subscribing witnesses.

SHELLEY E. LEE.

Witnesses:
SILVEY PEARLE TINSLER,
R. P. TALBOT.